Sept. 12, 1950          M. KADENACY          2,522,118

POWER PLANT COMBUSTION GAS EXHAUST CONTROL

Filed May 19, 1945          4 Sheets-Sheet 1

INVENTOR
Michel Kadenacy
BY
Dale A. Bauer
ATTORNEY

Sept. 12, 1950 M. KADENACY 2,522,118
POWER PLANT COMBUSTION GAS EXHAUST CONTROL
Filed May 19, 1945 4 Sheets-Sheet 4

INVENTOR.
Michel Kadenacy
BY
Dale A. Bauer
ATTORNEY

Patented Sept. 12, 1950

2,522,118

UNITED STATES PATENT OFFICE 2,522,118

POWER PLANT COMBUSTION GAS EXHAUST CONTROL

Michel Kadenacy, Summit, N. J.; Nina K. Guercken, Summit, N. J., executrix of said Michel Kadenacy, deceased Application May 19, 1945, Serial No. 594,641

6 Claims. (Cl. 60—41)

This invention relates to power generating apparatus and is concerned more particularly with a novel apparatus for utilizing the energy in exhaust gases produced by the burning of successive charges of a combustible mixture in a chamber, the volume of which remains constant or substantially constant during the exhaust of the burned gases and the inlet of fresh gaseous charges. In the operation of new apparatus, the discharge of burned gases from and the admission of fresh charges into the combustion chamber are carried on in accordance with the phenomena of explosive exhaust and implosive inlet, respectively, and the chamber is thus self-cleaning and self-charging and need not be supplied with air or gas under pressure for scavenging and charging purposes. The burned gases leave the chamber in a mass and are stored at high pressure and utilized for driving a prime mover, such as a turbine. In the new plant, the dynamic energy of the exhaust gas masses is employed to prevent the gases stored under pressure from interfering with or impairing the utilization of the phenomena of explosive exhaust and implosive inlet in the functioning of the combustion chamber. The apparatus accordingly operates at high efficiency.

The combustion chamber of the new apparatus may be a chamber of constant volume having inlet and exhaust orifices controlled by valves, or it may be the cylinder of a two-stroke cycle internal combustion engine, such a cylinder having a substantially constant volume during the exhaust period. The inlet and exhaust orifices of the cylinder may be controlled by valves or by the piston or pistons of the engine. If desired, the gas producing means of the apparatus may include a plurality of chambers or cylinders.

A number of my prior patents, such as 2,102,559, 2,123,569, and 2,131,959, disclose that, in order to attain explosive exhaust from a chamber containing gases under pressure and provided with an exhaust orifice opening into an exhaust conduit, the orifice must have at least a minimum size in relation to the cross-sectional area of the chamber and, when explosive exhaust is to occur, the orifice must be opened to at least a minimum extent in at least a minimum time interval. When such an orifice is thus opened, the gases within the chamber react upon the chamber walls and their mass is accelerated in a direction out of the chamber through the orifice. During its period of acceleration, the mass of burned gases accelerates inert gases lying in its path in the exhaust conduit adjacent the exhaust orifice and the mass of inert gases thus accelerated is combined with the mass of burned gases producing the acceleration to form what may, for convenience, be referred to as an "exhaust gas mass." As the acceleration of such an exhaust gas mass continues, the mass finally attains a momentum so great that the burned gases cease to react upon the chamber walls. At that instant, the period of acceleration ceases and the mass continues to move out of and away from the chamber at ballistic speed solely by virtue of its momentum.

The inert gases present in an exhaust gas mass are those which lie between the burned gases and the place reached by the acceleration front traveling through the inert gases, at the instant that the period of acceleration of the exhaust gas mass ends. The exhaust gas mass has its greatest speed and momentum and, accordingly, its greatest dynamic energy in explosive exhaust at the instant when the burned gases cease to react upon the chamber walls, the period of acceleration of the exhaust gas mass is ended, and the burned gases start to leave the chamber as a mass.

As the exhaust gas mass travels through the conduit, after the end of the acceleration period, it pushes, compresses, and displaces the mass of inert gases in its path, and, because of the work so done, the speed and dynamic energy of exhaust gas mass decreases. A moving pressure front develops within the traveling exhaust gas mass and the inert gases acted thereon and, in that front, the dynamic energy of the exhaust gas mass is continuously transformed into potential energy of gas pressure. At the instant that the exhaust gas mass has lost all its dynamic energy, a static rebounding pressure front forms in the gases and then immediately explodes with the result that part of the gases is projected backwardly toward the chamber.

The phenomenon of implosive inlet is similar in nature to that of explosive exhaust in that, in each case, a medium at a given pressure is caused to explode and enter a space containing a medium at a low pressure. The utilization of implosive inlet to fill a combustion chamber, accordingly, depends on the provision of an inlet orifice of a minimum size in relation to the cross-sectional area of the chamber and the opening of such an inlet orifice to at least a minimum extent in at least a minimum time interval. For optimum results, the inlet orifice should be opened at or just after the instant that the mass of burned gases within the chamber ceases to react upon the chamber walls and begins to move out of the chamber, leaving a potential void within the chamber into which the fresh charge can implode. The effectiveness of implosive inlet, accordingly, depends largely upon the effectiveness of the explosive exhaust of the contents of the chamber and the formation of the potential void thereby within the chamber.

In a power plant, in which the exhaust gases from a combustion chamber are stored under pressure and used to operate a prime mover, it is advantageous to store the gases at high pressure in order to increase the output of the prime mover. However, any such increase in the pressure of the stored gases increases the magnitude of the mass of inert gases opposing the burned gases during their acceleration and hence decreases their speed and momentum. On the other hand, it is advantageous to obtain maximum acceleration of each exhaust gas mass in order that the mass may have maximum velocity and dynamic energy. Any decrease in the velocity, at which the burned gas mass leaves the chamber, will adversely affect self-cleaning of the chamber and refilling thereof by the action of the gas alone. To prevent such a reduction in the velocity of exit of the burned gas mass from the chamber, the mass of inert gases in the exhaust conduit in the vicinity of the exhaust orifice at the time a mass of burned gases within the chamber starts its explosive exhaust should be small. In such a power plant, therefore, the condition for maximum output of the prime mover, that is, maximum pressure of the stored gases driving it, is apparently incompatible with the condition for best utilization of explosive exhaust and implosive inlet, namely, low resistance offered by the mass of inert gases in the exhaust conduit to acceleration of the burned gases within the chamber.

The present invention is directed to the provision of a novel power plant of the kind, in which successive charges of a combustible mixture are burned in a chamber and the exhaust gases are stored under relatively high pressure and used to operate a prime mover. In the new installation, the chamber is cleaned and charged in accordance with the phenomena of explosive exhaust and implosive inlet and the dynamic energy of the exhaust gas masses is employed to prevent impairment of the utilization of these phenomena. For this purpose, each exhaust gas mass leaves the chamber through a conduit and enters a receiver, the conduit and receiver both containing inert gases and being of such construction that the mass travels outwardly from the chamber, until a static rebounding pressure front is formed in the receiver. Between the exhaust orifice and the place of formation of the static pressure front, the linear movement of the exhaust gas mass is converted into rotational movement and a swirling body of gas is formed, the momentum of which is such as to prevent gases rebounding from the static front from re-entering the conduit and chamber.

The conversion of the linear movement of each exhaust gas mass to rotational movement is effected in the new apparatus by a device including means, such as vanes or nozzles, for deflecting the gas passing through it and, in order that the gases may be stored in the receiver under high pressure without interfering with explosive exhaust and implosive inlet, the device is so disposed that its outlet is at approximately the position of the leading end of the exhaust gas mass at the instant that this mass has its maximum dynamic energy. The device thus operates on substantially the entire exhaust gas mass and no inert gases are pushed through the device by the exhaust gas mass at an expenditure of dynamic energy. The mass, therefore, acquires the maximum speed of rotation under the conditions of operation and is effective to prevent return of gases into the conduit, even though the gases are stored beyond the device at high pressure. The point, where the device is located, is that reached by the acceleration front traveling through the inert gases in the conduit at the instant the burned gases within the chamber cease reacting upon the chamber walls and the acceleration of the exhaust gas mass comes to an end, and this point in any given installation can be readily determined by suitable means, such as an oscillograph. By bringing about the conversion of the movement of each exhaust gas mass from one form to the other at the place specified, one condition for maximum effectiveness of the rotating gas mass in preventing return of the gas rebounding from the static pressure front toward the exhaust orifice is satisfied. Other conditions for optimum results have to do with the construction of the exhaust gas conduit and of the converting device, and with the form of th espace into which the gases are discharged from the deflecting means of the device.

The exhaust conduit in the new apparatus is constructed to prolong the outward movement of the exhaust gas masses and it provides a substantially free passage, through which the masses travel without substantial deformation or unnecessary friction. The conduit, accordingly, has a cross-sectional area adjacent the exhaust orifice, which is substantially equal to the area of the opening of the exhaust orifice of the combustion chamber at the time that the burned gases begin to leave the chamber in a mass. The conduit may increase in cross-section along its length, either gradually or step by step, the increase being comparable to that of a conical tube having a conicity of 1% to 10%. A conduit of the form described contains the smallest volume of inert gases per unit of length in the direction of movement of the exhaust gas mass, and the inert gases in the conduit, accordingly, offer minimum resistance to travel of the exhaust gas mass per unit of length of such travel. For the same reason, the use of such a conduit permits the attainment of the maximum speed of the exhaust gas mass.

The length of the exhaust conduit plus the distance through the converting device to the outlet thereof is preferably not substantially shorter than the distance traveled by the acceleration front through the inert gas mass during the acceleration period of the burned gases, since otherwise the dense mass of inert gases within the receiver will offer resistance to the burned gases during the aceleration thereof and maximum speed of the exhaust gas mass will not be attained. Similarly, the length of the exhaust conduit plus the distance through the converting device to its outlet should not substantially exceed the distance traveled by the acceleration front through the inert gases in the exhaust passage during the acceleration of the burned gases, since, if the specified distance is too great, part of the dynamic energy of each exhaust gas mass will be transformed into potential energy of gas pressure in the pressure front traveling through inert gases, instead of being utilized to produce high speed rotational movement of the exhaust gas mass. As an approximate value to facilitate the determination of the optimum length of the exhaust conduit and the location of the converting device, it may be stated that the conduit should be of such length that its internal volume will be three to four times the volume of the combustion chamber, when the transverse cross-sectional area of the conduit at the end adjacent the exhaust orifice is substantially equal to the area of the opening of that orifice at the end of the period of acceleration of the burned gases.

The device for converting the linear movement of each exhaust gas mass into rotational movement includes a suitable chamber, in which the rotational movement of the gaseous mass takes place, and, if desired, the device may be mounted within the receiver adjacent the inlet end thereof. The chamber or the receiver includes a wall or a deflecting surface lying substantially tangent to the direction of movement of the gases as the latter issue from the deflecting means of the device, and the chamber or receiver is of such construction that the gases rotate in a path of greater radius than the distance from the center of their rotation to the outlet of the deflecting means. Also the inlet to the deflecting means is spaced inwardly from the outlet therefrom. In order that the exhaust gases may pass through the device against a minimum resistance offered by previously stored inert gases per unit of travel through the device, the sum of the cross-sectional areas of the passages through the device is substantially the same as that of the exhaust conduit, and the speed and dynamic energy of each exhaust gas mass are thus utilized almost entirely in producing rotational movement of the gases. Preferably, the cross-sectional areas of the passages through the device are increased slightly along their length, as described in connection with the conduit.

The outlet of the deflecting device leads to a space containing a small volume of previously stored gases in rotation and each ballistically moving gas mass issuing from the device thus pushes the previously stored gases toward the receiver with little expenditure of energy per unit of travel in such movement toward the receiver. The rotation of each exhaust gas mass at high velocity prevents gases rebounding from the static pressure front from entering the exhaust conduit and combustion chamber and a relatively low pressure prevails in the exhaust conduit between successive exhausts. If desired, the exhaust orifice may be kept open for a sufficient period after the opening of the inlet orifice to permit fresh gases to travel through the chamber for cooling purposes and enter the exhaust conduit. The centrifugal action of each exhaust gas mass in high speed rotation creates a depression at the center of rotation, into which flow any gases present in the conduit. As a result, the inert gases in the exhaust conduit after each exhaust are at relatively low pressure and this enhances the subsequent explosive discharge of burned gases from the chamber.

The receiver, in which the gases are stored, is of relatively large volume, so that the mass of gases therein is sufficient to damp the oscillations produced by successive explosive exhausts, which occur at relatively short intervals, particularly when the gas producing means includes a plurality of combustion chambers or engine cylinders. By using a receiver of appropriate size, the hammering effect of successive exhausts is smoothed out and the stored gases flow smoothly from the receiver to the prime mover.

For a better understanding of the invention, reference may be made to the accompanying drawings, in which like reference characters refer to like parts throughout the several views. In the drawings.

Figures 1, 2:
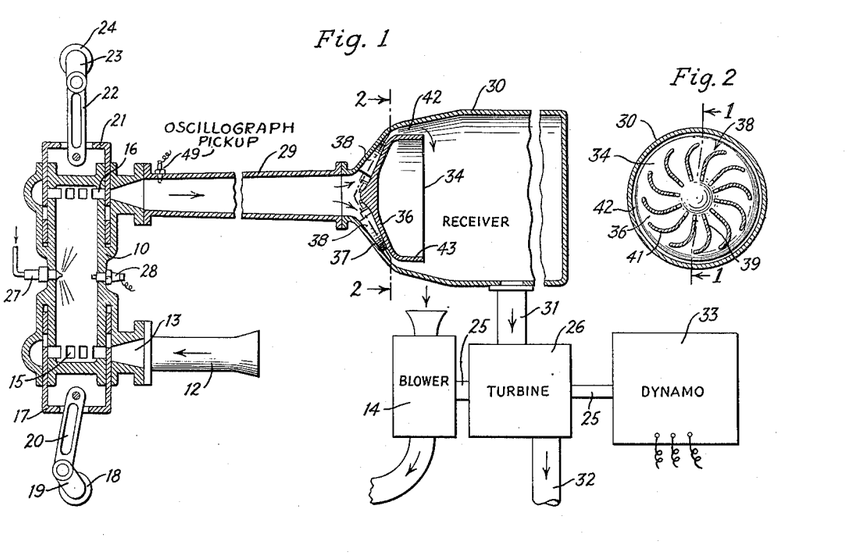
Fig. 1 is a diagrammatic side elevation view, partly in section and with parts broken away, showing one form of gas turbine power plant which embodies and is adapted to be operated in accordance with the method of the present invention, the section being taken substantially along line 1—1 of Fig. 2.
Fig. 2 is a sectional view taken substantially on line 2—2 of Fig. 1.

The power plant illustrated in Fig. 1 includes a combustion chamber 10 in the form of an elongated cylinder, the length of which is preferably several times greater than the cross-sectional area thereof taken transversely of its longitudinal axis. A combustible supporting medium, such as fresh air or a combustible mixture, may be supplied to cylinder 10 at atmospheric pressure through an air conduit 12 or, if desired, the inlet passage 13 may be directly connected with a blower 14 or other suitable source of air under pressure. The inlet air or other medium is preferably admitted to chamber 10 through one or a series of inlet ports or orifices 15 in the wall of the chamber adjacent one end thereof. The ports are preferably shaped in some known manner for imparting a swirling motion to the incoming air or charge and the area thereof is preferably more than one-half as great as the transverse cross-sectional area of chamber 10. The burned gases are discharged from the cylinder or combustion chamber 10 through one or more exhaust ports or orifices 16 adjacent the other end of the chamber, the area of said port or ports being approximately the same as or slightly less than the area of inlet ports 15.

The opening and closing of inlet ports 15 may be controlled by any suitable means, such as a sleeve valve 17, which may, in turn, be actuated by a rotatably driven shaft 18 having a crank 19 connected with the valve by a connecting rod 20.

Exhaust ports 16 may be controlled by a similar sleeve valve 21 which is operatively connected by a connecting rod 22 to the crank 23 of a rotatably driven shaft 24. It will be understood that ports 15 and 16 or port means equivalent thereto may be controlled by various other types of valves or mechanisms, such as poppet valves, piston valves, and the like. The crankshafts 18 and 24 or other suitable means for controlling the inlet and exhaust ports may be operatively connected with the shaft 25 of a turbine 26 which forms a part of the power plant comprehended by the invention or the crankshafts may be driven by any other suitable source of energy. Shafts 18 and 24 may be connected together or driven separately and in some instances the function thereof may be accomplished by a single shaft.

In the illustrated embodiment, the means for supplying a combustible medium to chamber 10 comprises a liquid fuel injection nozzle 27 or other suitable injection device which may be mounted in the wall of the chamber and may be any suitable known construction. The ignition or combustion mixture of the charge within chamber 10 may be initiated by means of a spark plug 28 or other suitable device. Suitable control means of any known construction may be provided for controlling the injection of fuel and the occurrence of a spark across the electrodes of spark plug 28, so that the injection of the fuel and the ignition thereof will occur in suitably timed relation to each other and in properly timed relation with the operation of the control means for the inlet and exhaust ports.

In order to utilize to the best advantage the energy liberated by the burning of a charge within combustion chamber 10, novel means are provided for trapping or storing the burned or exhaust gases under pressure within an enclosed space outside of the chamber. In the construction shown, the means comprises a tubular exhaust gas conduit 29 connected with chamber 10 in such a manner that burned gases will pass from the chamber into the conduit when the exhaust ports are opened. By opening these ports to a sufficient extent in a sufficiently short interval of time, the burned gases will be projected from chamber 10 into conduit 29 in accordance with the phenomenon of explosive exhaust, as described in my prior patents. Likewise, when the inlet ports 15 are opened in a like manner in properly timed relation with the beginning of the mass movement of the explosively exhausted burned gases, the inlet of fresh air will take place in accordance with the phenomenon of implosion. Chamber 10 will thus be self-cleaned and adequately recharged during each cycle of operation without the assistance of mechanical means and without the necessity for scavenging by means of air and pressure.

The transverse cross-sectional area of conduit 29 adjacent the exhaust ports 16 is substantially equal to the total area of the ports, which is open at the instant that the burned gases start to leave the chamber by virtue of their momentum, that is, at the end of the period of acceleration of the gases. The exhaust conduit may increase in cross-section gradually throughout its length in a direction away from the exhaust ports with a conicity of from 1% to 10%, or the conduit may increase in cross-section by steps or be partly conical and partly stepped. If desired, a part of the conduit may be cylindrical.

The end of the conduit 29 remote from the chamber is connected to an exhaust gas receiver 30 in which the exhaust gases may be stored under pressure for use in performing useful work. For example, the receiver 30 may be connected by means of a conduit 31 to a turbine 26 of any suitable known design having an exhaust pipe 32. The receiver is illustrated as being generally cylindrical but it may have any of many suitable shapes and, if desired, may be an integral part of the casing of turbine 26. The shaft 25 of the turbine is illustrated as connected to a blower 14 and a dynamo 33, but the turbine may be employed to drive other machines, as desired. The gases leaving conduit 29 on their way to receiver 30 pass through a device for converting the linear movement of the gases to rotational movement and, in the Fig. 1 construction, the converting device is disposed within the receiver adjacent the inlet therethrough. The device includes a deflecting drum or cylinder 34 centrally disposed within receiver 30 adjacent the inlet thereof and having a cone-like end wall 36 facing the outer end of conduit 29. The end wall 37 of container 30 is also preferably tapered or cone-shaped and is so disposed in relation to surface 36 that the space between that surface and end wall 37 is of a cross-sectional area substantially equal to that of the outlet end of conduit 29. If desired, the cross-sectional area of the space between surfaces 36 and 37 taken transversely of the direction of movement of the gaseous masses may be increased proportionately to the increase in the cross-sectional area of conduit 29 for each increment of distance away from cylinder 10.

Each exhaust gas mass passing between surface 36 and end wall 37 is given a rotary movement by vanes 38, the inner portions of which extend outwardly in radial planes from the longitudinal axis 40 of conduit 29 and receiver 30. The outer portions 41 of the vanes are curved like portions of spirals, so that the gases are discharged from between the vanes substantially tangentially into the annular space 42 between the flange 43 of drum 34 and the adjacent wall of receiver 30. Preferably, the cross-sectional area of space 42 is increased gradually and slowly from the outlet of directing vanes 38 toward the interior of receiver 30. The operation of the power plant described in accordance with the method of the invention is as follows. After each burning of a charge inside the combustion chamber 10 while the inlet and exhaust ports are closed, the exhaust orifices 16 are opened wide in a very brief interval of time by the actuation of valve 21. The interval is sufficiently short and the opening is sufficiently wide in relation to the transverse cross-sectional area of combustion chamber 10, as disclosed in my prior patents, to permit the burned gases to leave the cylinder through ports 16 as a mass at ballistic speed. When the ports are thus opened, the burned gases react against the walls of chamber 10 and are accelerated in a direction out of the chamber through the ports. During the period of acceleration, the burned gases also accelerate inert gases in the exhaust conduit 29 to form an exhaust gas mass, as previously explained. When the exhaust gas mass has acquired sufficient acceleration, the burned gases cease to react against the chamber walls and the mass starts to move away from the chamber at ballistic speed, by virtue of its momentum. The mass exit of the gases from the chamber leaves a potential void and, at the instant that such exit starts, or immediately thereafter, inlet ports 15 are opened to a sufficient extent and in a sufficiently short interval to bring about an implosion of a fresh gaseous charge into the chamber.

During the period of acceleration of the burned gases, a shock or acceleration front travels through the inert gases within conduit 29 toward receiver 30 and this front reaches the outlet from the converting device at approximately the time that the period of acceleration ends. Each exhaust gas mass includes the burned gases and the inert gases in conduit 29 between the exhaust ports and the point reached by the acceleration front when the period of acceleration of the burned gases ceases. Accordingly, by placing the converting device so that its outlet is approximately at the critical point referred to, substantially the entire exhaust gas mass leaving the chamber in each explosive exhaust passes through the device at a time when the gas mass has maximum dynamic energy. The rotating gas mass produced by passage of the gases through the device, therefore, has a maximum speed of rotation and greatest effectiveness in preventing the return of gases from the receiver into the conduit, under the conditions of operation. In the operation of the apparatus, the successive explosive exhausts occur at sufficiently frequent intervals to insure the continuous high speed rotation of a mass of gas in space 42.

As substantially all of each exhaust gas mass passes through the converting device into the receiver, the gas pressure within conduit 29 is relatively low between successive exhausts. Also the high speed rotation of the gases issuing from the converting device tends to create a depression at the inlet of the device into which inert gases in the conduit flow. As a result, the mass of the inert gases in the conduit per unit of length thereof is correspondingly small and the inert gases, accordingly, offer little resistance to the acceleration of the burned gases produced by the combustion of the next charge in the chamber. The reduction in pressure in the conduit improves the operation, in that each exhaust gas mass issues from the chamber with greater dynamic energy and velocity and the rotation of each such gas mass produced by the converting device is at a higher speed. Each rotating gas mass is, accordingly, more effective in preventing the return of gases under pressure in the receiver and the gases may be stored at a higher pressure.

After the burned gases have left the combustion chamber, the ports 16 are closed and the closing may be delayed to permit some fresh gases to pass through the chamber and enter the exhaust conduit. The inlet ports are closed shortly after the closing of the exhaust ports and preferably before any of the fresh gases emitted to the chamber can rebound therefrom through the inlet ports.

Figure 3:
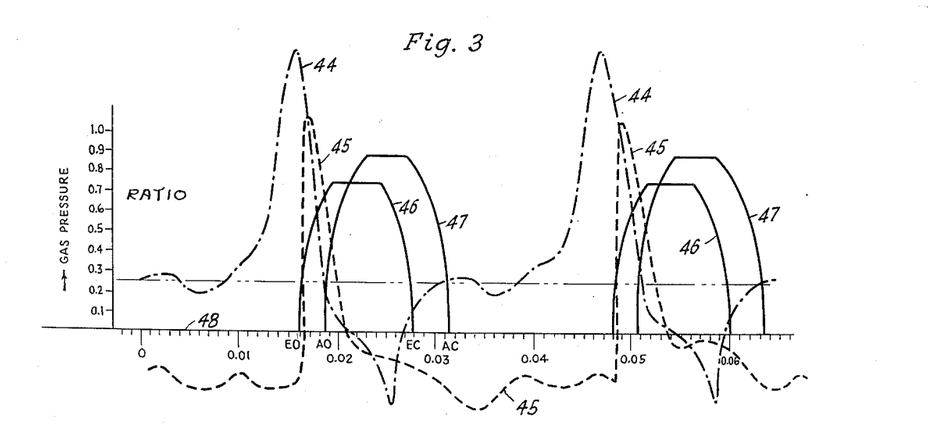
Fig. 3 is a graph illustrating the operation of a typical gas turbine power plant of the character illustrated in Fig. 1.

The operation of a typical power plant constructed and operated in accordance with this invention is graphically illustrated, by way of example, in Fig. 3 of the drawings. On the graph the ordinates represent gaseous pressure with respect to curves 44 and 45 and, with respect to curves 46 and 47, the ordinates represent the areas of the exhaust and inlet ports, respectively, opened by the exhaust and inlet valves, the opened areas being expressed in terms of the ratios between the opened areas and the transverse cross-sectional area of the combustion chamber. The abscissae represent time expressed in terms of thousandths of a second or in terms of the degrees of rotation of the shafts which control the operation of the valves for opening and closing the exhaust and inlet orifices. The base line 48 represents the pressure of the inlet air or combustible mixture at the source of supply thereof which, as pointed out above, may be either atmospheric pressure or the pressure of gases supplied by a blower or reservoir.

The curve 46 is a time-area diagram which represents the area of opening and the times of opening and closing of exhaust orifices 16 and curve 47 is a similar diagram representing the opening and closing of inlet orifices 15. The instants at which the exhaust and inlet orifices begin to open are indicated at EO and AO, respectively, and the instants at which said orifices are completely closed are indicated at EC and AC, respectively. The curve 44 is a time-pressure curve and represents the apparent gaseous pressures within the combustion chamber during each cycle of operation and the time-pressure curve 45 is indicative of the apparent gaseous pressures in exhaust conduit 29 at a point adjacent the connection between conduit 29 and chamber 10. Curves 44 and 45 accordingly show the figurative pressure conditions during each cycle of operation at the respective positions at which the pressure measurements are taken. As heretofore pointed out, these pressures may be determined in any known manner, such as by the use of a cathode ray oscillograph having a pick-up device 49 (Fig. 1).

As indicated by the curves of Fig. 3, exhaust ports 16 begin to open at approximately the time that the gaseous pressure within combustion chamber 10 (curve 44) reaches its maximum or peak value. When the exhaust orifices open there is a sharp pressure impulse in the vicinity of pick-up device 49 in conduit 29, but the apparent pressure at this point drops immediately and levels off somewhere below the base or relative zero pressure line 48 after the ballistically projected exhausted gas mass passes the point. The pressure at point 49 continues to remain below the pressure represented by line 48 between successive explosive exhausts by reason of the action of the rotating mass of gas in space 42 which prevents the return of gases into conduit 29 and by reason of the suction effect created in conduit 29 by the rotating gaseous mass.

The point at which curve 44 crosses the base pressure line 48 is indicative of the instant when the burned gases cease to react against the walls of chamber 10 and begin to move as a mass by virtue of its inertia, thereby tending to create a void in the chamber in the vicinity of the inlet orifices. At or about this instant the inlet orifices should be opened to permit the implosion of a fresh charge into chamber 10. The pressure of the fresh charge rises during and after the closure of the exhaust orifices and reaches a point above the base pressure line 48, which represents the pressure at the source of air supply, before the inlet orifices are closed. This supercharging of the combustion chamber results from the self-compression of the fresh incoming gases effected by the momentum thereof within the combustion chamber.

Figures 4, 5, 6:
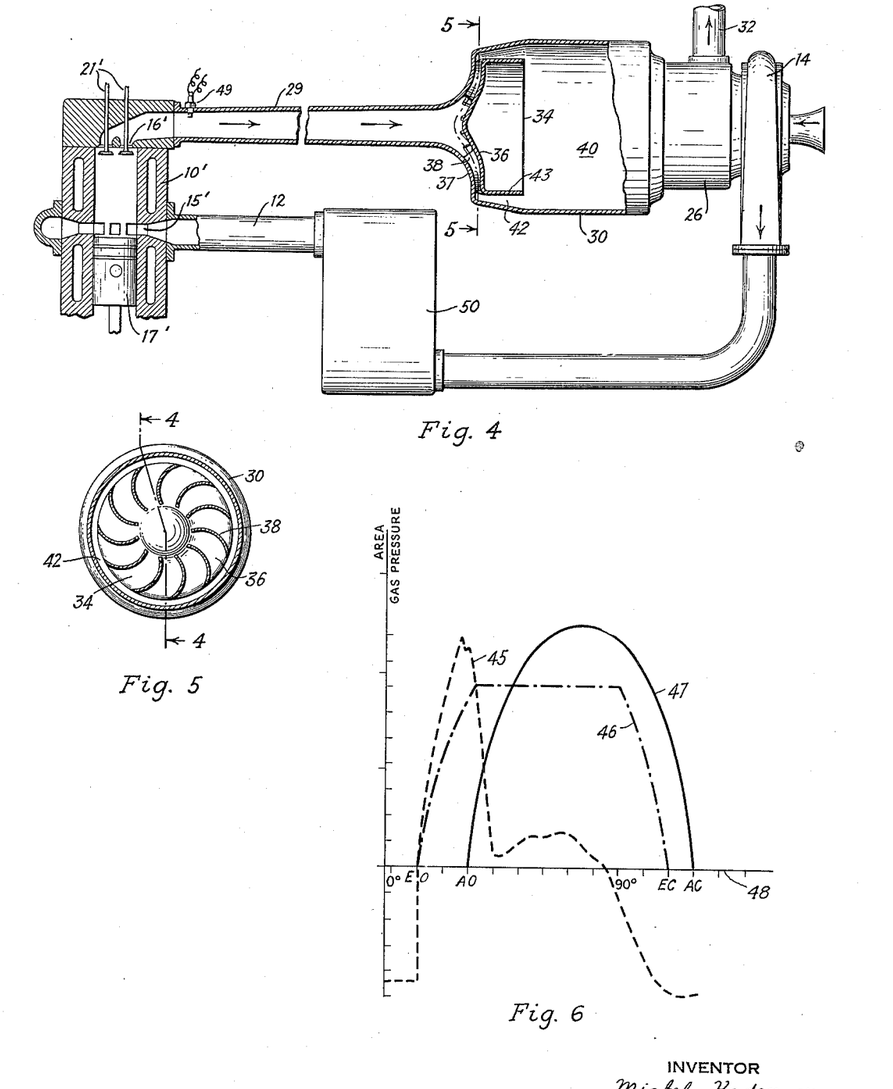
Fig. 4 is a diagrammatic side elevation view, partly in section and with parts broken away, showing another embodiment of the invention wherein the cylinder of a two-cycle internal combustion engine is utilized as the exhaust gas producing device, the section being taken substantially along line 4—4 of Fig. 5.
Fig. 5 is a sectional view taken substantially on line 5—5 of Fig. 4.
Fig. 6 is a graph which illustrates the operation of the power plant installation shown in Fig. 4.

The modified embodiment of the invention illustrated in Fig. 4 is generally similar to the embodiment of Fig. 1 and corresponding parts in both embodiments are accordingly designated by the same reference numerals. In this embodiment, the combustion chamber 10' is constituted by the cylinder of a two-stroke cycle internal combustion engine wherein the inlet ports 15' are controlled by the reciprocating piston 17' which functions as a valve. The exhaust orifices 16' are controlled by poppet type valves 21' in lieu of the sleeve valve illustrated in Fig. 1. The functioning of the parts is the same as that described above in connection with the first embodiment, the piston 17' being connected to the crankshaft of the engine and the valve 21' being operated in timed relation with the rotation of the crankshaft of the engine by means of any of a large number of suitable means well known in the art. In addition to the elements included in the embodiment of Fig. 1, the structure of Fig. 4 comprises an air receiver or reservoir 50 which is interposed between the blower 14 and inlet pipe 12 for the purpose of increasing the mass of the fresh charge which is introduced into combustion chamber or cylinder 10 during each cycle of operation. In order to obtain best results and maximum supercharging of chamber 10' in any given installation, air receiver 50 and air conduit 12 should be constructed and installed in accordance with the teaching of my patent No. 2,281,585.

The specific construction of exhaust gas receiver 30 and the gas directing means which controls the entrance of the exhaust gases into the receiver are specifically different from that illustrated in Fig. 1, but this is immaterial so long as the conditions outlined in connection with the description of Fig. 1 are met.

The graph of Fig. 6 is similar to that of Fig. 3 and represents the operation of the embodiment of Fig. 4 in the same manner that Fig. 3 represents the operation of the embodiment of Fig. 1.

Figure 7:
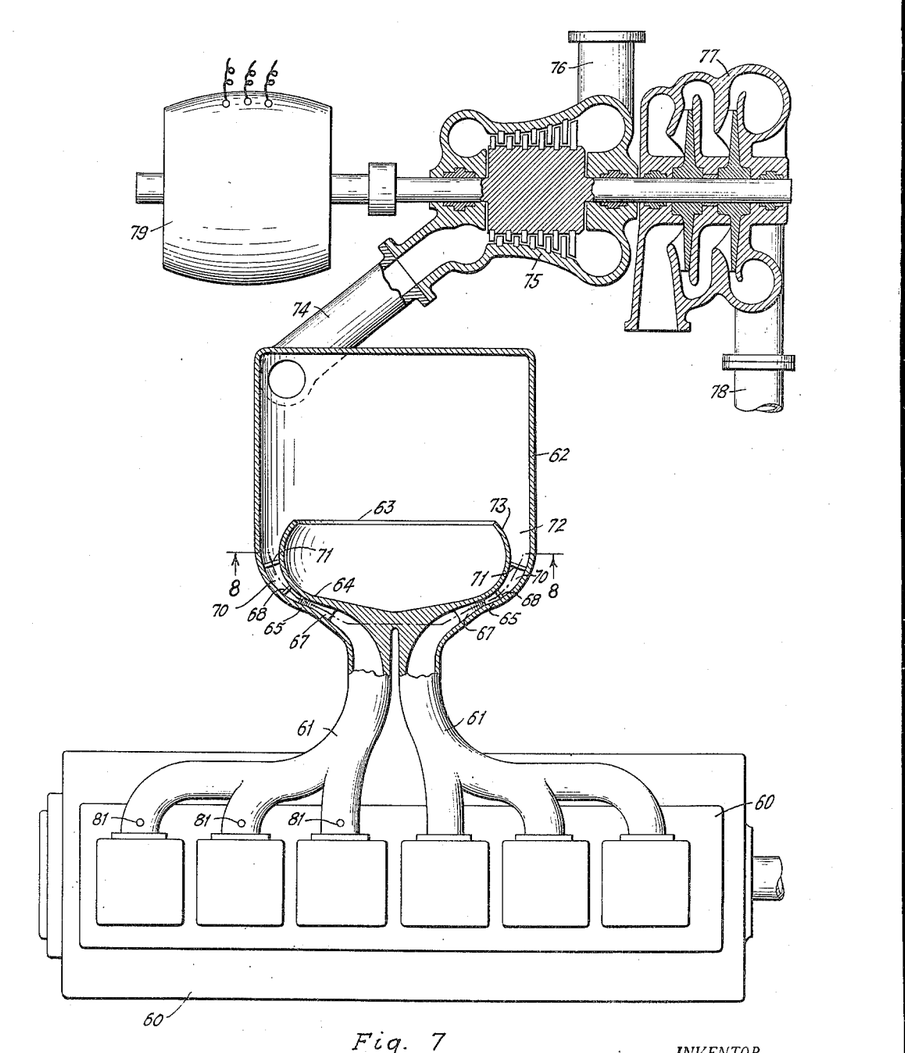
Fig. 7 is a diagrammatic plan view, partly in section and with parts broken away, illustrating one manner of utilizing the invention in conjunction with a multi-cylinder internal combuston engine.
Figures 8, 9:
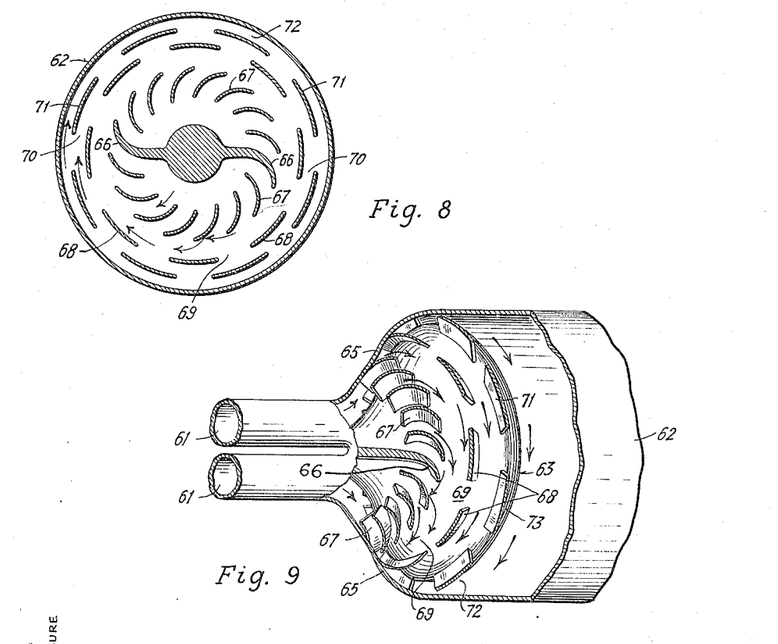
Fig. 8 is a sectional view taken substantially on line 8—8 of Fig. 7.
Fig. 9 is an isometric view of the parts illustrated in Fig. 8 with the walls of the exhaust gas conduit and receiver partially removed.

In the embodiment of Figs. 7 to 9, inclusive, the invention is diagrammatically illustrated in the form of a power plant which incorporates a six-cylinder two-stroke cycle engine 60 which is adapted to function by explosive exhaust and implosive inlet either with or without a blower or other source of inlet air under pressure in a manner now well understood in the art. In the form shown, the cylinders are divided into two groups of three cylinders each and the exhaust orifices of each group of cylinders are connected to an exhaust conduit 61 which corresponds with exhaust conduit 29 in the embodiment of Figs. 1 and 4. The cylinders connected to a single exhaust conduit should be so chosen that the exhaust orifices of only one of said cylinders will be open at any one time. If desired, each group of cylinders may comprise more or less than three cylinders and, if necessary, additional exhaust conduits may be provided. In some cases, it may be desirable to provide a separate exhaust conduit for each or some of a plurality of cylinders.

The exhaust conduits 61 conduct the explosively exhausted gases from the cylinders of engine 60 to an exhaust gas receiver or container 62. The entrance to said container from conduits 61 is formed in part by a drum 63, the closed end 64 of which is adjacent the end wall 65 of container 62. Fins 66 (Fig. 8) form a juncture between drum 63 and conduits 61, 61 and thereby segregate the entrances of these two conduits into receiver 62, as is best seen in Fig. 8.

Gases projected through conduits 61 pass between curved vanes 67 which extend spirally with respect to the axis of drum 63 and container 62 and direct the gases at a sharp angle or nearly tangentially with respect to the outer curved surface of container 62 and an annularly disposed row of circumferentially spaced blades or vanes 68. Vanes 68 extend between the surfaces 64 and 65 and are substantially perpendicular to the surfaces at the points of juncture, thereby forming an annular space 69 between the outlets from vanes or nozzles 67 and plates 68. Accordingly, as the gases emerge from curved vanes 67 at a sharp angle (nearly tangentially) against the surfaces of spaced blades 68, the gases are caused to rotate at high speed in annular space 69.

The spaces between the adjacent ends of blades 68 are sufficient to permit the rotating gases to be pushed from the space of rotation 69 toward the interior of container 62 by gases subsequently projected through vanes 67. A second annular space of rotation 70 may be formed by the blades 68 and a similar series of blades 71. Preferably blades 71 are alternated in a circumferential direction with blades 68. As the rotating gases are pushed by successive explosive exhausts from annular space 70, the gases enter the tapering space 72 between the surface 73 of drum 63 and the outer wall of container 62.

It will thus be seen that conduits 61 communicate with each other only by way of the space of rotation 69 and that gases projected through one of the conduits 61 cannot enter the other conduit or conduits 61 until the gases have passed through curved vanes 67 and have been set into rotation in the annular space 69. However, rotational movement of a mass of gas discharged through one conduit 61 will be supplemented and maintained by explosive discharges through the other conduit 61.

Except for the provision of a multiplicity of cylinders or combustion chambers, the operation of the embodiment of Fig. 7 is the same as that described above in connection with Figs. 1 and 4. The rotating gases in annular spaces 69, 70 and 72 are prevented by centrifugal force and the deflecting action of vanes 67 from returning to conduits 61 and, at the same time, form a barrier to the return into the conduits of gases stored under pressure in container 62. Preferably, the groups of cylinders for each of the exhaust conduits 61, 61 are so chosen that the explosive exhausts through the conduits alternate during engine operation and thereby maintain a high speed of rotation of the gases in spaces 69 and 70. The higher the speed of the rotating mass of gases, the greater will be the suction effect within conduits 61, 61 for withdrawing inlet gases from the conduits to thereby facilitate and promote subsequent explosive exhausts.

Gases trapped under pressure in container 62 are permitted to expand through a conduit 74 and a turbine 75 of any suitable design having an exhaust 76. The turbine may, in turn, drive a suitable blower 77, the outlet 78 of which may, if desired, be connected to the inlet orifices of the cylinders of engine 60, either directly or through an air receiver, as disclosed above in connection with the embodiments of Figs. 1 and 4. The shaft of turbine 75 may also be connected to a dynamo 79 or other work performing device.

Figure 10:
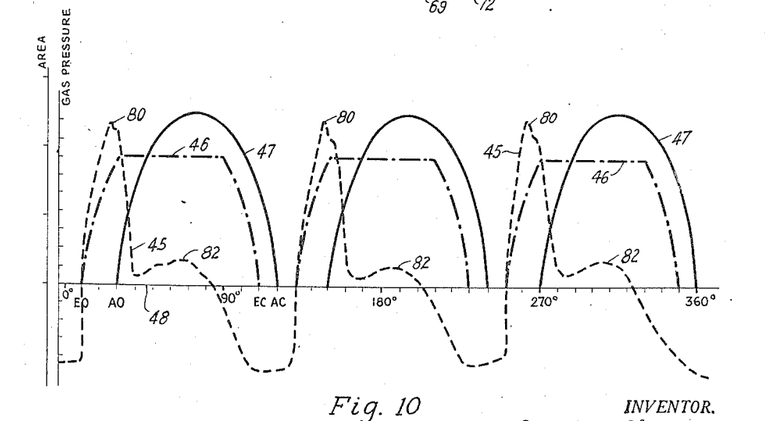
Fig. 10 is a graph which illustrates the operation of a typical power plant of the character illustrated in Fig. 7.

The graph of Fig. 10 is a typical diagram similar to those shown in Figs. 3 and 6 illustrating the operation of one group of three cylinders during one revolution of the crankshaft of the engine illustrated in Fig. 7. The various curves are identified by the same numerals as the corresponding curves of Fig. 3. The peak pressures indicated by points 80 on the curve 45 represent the passage of successively exploded masses of exhaust gases past the points 81, i. e., the points at which the pressure measurements for curve 45 are taken in the branches of conduit 61 leading from three of the engine cylinders. The apparent pressure rise at points 81, as indicated by the portions 82 of curve 45 (Fig. 10), represent the appearance of inlet gases at these points. The pressure then drops as the exhaust port is closed, such reduction in pressure in the exhaust conduit 61 being accomplished partly by the withdrawal of some of such inlet gas from conduit 61 by the suction effect of the mass of gases rotating in the annular entrance 69, 70 to container 62. It will be understood that the cycle of operation illustrated by the curves of Fig. 10 will be repeated for each revolution of the engine crankshaft and that the other group of three cylinders will function in the same manner with the curves being offset 60 degrees from those illustrated in Fig. 10.

The phrase "substantially tangent" as used herein in connection with the direction of movement of the gases relative to a curved surface is to be understood as meaning that the direction of movement of the gases at the point of contact thereof with the curved surface makes a relatively small angle with the true tangent at that point. Although the smallest possible angle is desirable to insure rotation of the gases with the least amount of resistance of any kind and, hence, with greatest possible speed, this angle may be as great as 15 to 20 degrees, in some instances. The chief consideration is that the gases after leaving the vanes should not rebound from the surface defining the space of rotation at so great an angle as to interfere materially with the rotary movement of the gases.

In the foregoing, I have disclosed power generating apparatus, in which burned gases produced by the combustion of charges of fuel in a chamber of constant volume, which may be the cylinder of a two-stroke cycle internal combustion engine, are exhausted against back pressure in such manner as to permit the utilization of the phenomena of explosive exhaust and implosive inlet in the functioning of the chamber. In such apparatus, the gases are stored under pressure and may be employed in driving a prime mover. It will be apparent that the combination of the exhaust conduit and the means at the outer end of the conduit for converting the linear movement of the exhaust gas masses into rotational movement may be employed advantageously with an engine, even though the exhaust gases are not stored and later utilized. In such an installation, the combination of the conduit and converting means serves to maintain extremely low pressures in the conduit, so that the acceleration work of the exhaust gases is reduced with resultant improved scavenging and higher supercharging.

In the following claims, the terms "orifice" and "port" are intended to refer to either a single orifice or port or to a plurality of orifices or ports.

What is claimed is:

1. In a power plant comprising a combustion chamber, in which charges of combustible mixture are successively burned, the chamber having inlet and exhaust orifices, the combination of means for controlling the orifices to cause the burned gases produced by the burning of each charge to be accelerated and leave the chamber as a mass in explosive exhaust and to cause a fresh gaseous charge to enter the chamber implosively after the exit of the gas mass from the chamber is in full progress, a conduit leading at one end from the exhaust orifice and of such form as to prolong the travel of the exhaust gas masses therethrough along a substantially linear path, the conduit containing inert gases at relatively low pressure left behind after passage of each exhaust gas mass through the conduit, and means at the other end of the conduit for converting the linear movement of the exhaust gas masses to rotational movement to act in preventing return of exhaust gas masses through said means from the higher pressure zone beyond said means, said means being disposed at substantially the location of the acceleration front traveling through the inert gases in the conduit at the instant that the acceleration of the burned gases produced by the burning of each charge ceases.

2. In a power plant comprising a combustion chamber, in which charges of combustible mixture are successively burned, the chamber having inlet and exhaust orifices, the combination of means for controlling the orifices to cause the burned gases produced by the burning of each charge to be accelerated and leave the chamber as a mass in explosive exhaust and to cause a fresh gaseous charge to enter the chamber implosively after the exit of the gas mass from the chamber is in full progress, a conduit leading at one end from the exhaust orifice and containing inert gases at relatively low pressure left behind after passage of each exhaust gas mass through the conduit, which are accelerated by the burned gases produced by the burning of the next charge and combine with such burned gases to produce an exhaust gas mass, the conduit being of such form as to prolong the travel of the exhaust gas masses therethrough along a substantially linear path, means at the other end of the conduit for converting the linear movement of the exhaust gas masses to rotational movement to act in preventing return of exhaust gas masses through said means from beyond said means, said means being disposed at substantially the leading end of each exhaust gas mass at the time that the acceleration of the burned gases in said mass ceases, and a receiver connected to the converting means and storing under pressure gases received therefrom.

3. In a power plant comprising a combustion chamber, in which charges of combustible mixture are successively burned, the chamber having inlet and exhaust orifices, the combination of means for controlling the orifices to cause the burned gases produced by the burning of each charge to be accelerated and leave the chamber as a mass in explosive exhaust and to cause a fresh gaseous charge to enter the chamber implosively after the exit of the gas mass from the chamber is in full progress, a conduit leading at one end from the exhaust orifice and of such form as to prolong the travel of the exhaust gas masses therethrough along a substantially linear path, the conduit containing inert gases at relatively low pressure left behind after passage of each exhaust gas mass through the conduit, means connected to the other end of the conduit for converting the linear movement of the exhaust gas masses to rotational movement to act in preventing return of exhaust gas masses through said means from the higher pressure zone beyond said means, said means being disposed at substantially the leading end of each exhaust gas mass at the time that the acceleration of the burned gases in said mass ceases, a receiver connected to the converting means and storing under pressure gas received therefrom, and a prime mover connected to the receiver and driven by gases from the receiver, which pass through the prime mover.

4. In a power plant comprising a combustion chamber in which charges of combustible mixture are successively burned, the chamber having inlet and exhaust orifices, the combination of means for controlling the orifices to cause the burned gases produced by the burning of each charge to be accelerated and leave the chamber as a mass in explosive exhaust and to cause a fresh gaseous charge to enter the chamber implosively after the exit of the gas mass from the chamber is in full progress, a conduit leading at one end from the exhaust orifice and of such form as to prolong the travel of the exhaust gas masses therethrough along a substantially linear path, the conduit containing inert gases at relatively low pressure left behind after passage of each exhaust gas mass through the conduit, a receiver for storing inert gases under pressure and having an inlet connected to the conduit, and means within the receiver adjacent the inlet for converting the linear movement of the exhaust gas masses into rotational movement to act in preventing return of exhaust gas masses through said means from the higher pressure zone in the receiver beyond said means, said means being disposed at substantially the location of the acceleration from traveling through the inert gases at the instant that the acceleration of the burned gases produced by the burning of each charge ceases.

5. In a power plant comprising a combustion chamber, in which charges of combustible mixture are successively burned, the chamber having inlet and exhaust orifices, the combination of means for controlling the orifices to cause the burned gases produced by the burning of each charge to be accelerated and leave the chamber as a mass in explosive exhaust and to cause a fresh gaseous charge to enter the chamber implosively after the exit of the gas mass from the chamber is in full progress, a conduit leading at one end from the exhaust orifice and of such form as to prolong the travel of the exhaust gas masses therethrough, the conduit containing inert gases at relatively low pressure left behind after passage of each exhaust gas mass through the conduit, means connected to the other end of the conduit for converting the linear movement of the exhaust gas masses to rotational movement to act in preventing return of exhaust gas masses through said means from the higher pressure zone beyond said means, said means including an inlet and deflecting vanes extending outwardly therefrom and terminating short of the path of rotational movement of said gases, said means being disposed at substantially the location of the acceleration front traveling through the inert gases in the conduit at the instant that the acceleration of the burned gases produced by the burning of each charge ceases, and a receiver connected to the converting means and storing under pressure gases received therefrom.

6. In a power plant comprising a combustion chamber, in which charges of combustible mixture are successively burned, the chamber having inlet and exhaust orifices, the combination of means for controlling the orifices to cause the burned gases produced by the burning of each charge to be accelerated and leave the chamber as a mass in explosive exhaust and to cause a fresh gaseous charge to enter the chamber implosively after the exit of the gas mass from the chamber is in full progress, a conduit leading at one end from the exhaust orifice and of such form as to prolong the travel of the exhaust gas masses therethrough, the conduit containing inert gases at relatively low pressure left behind after passage of each exhaust gas mass through the conduit, means connected to the other end of the conduit for converting the linear movement of the exhaust gas masses to rotational movement to act in preventing return of exhaust gas masses through said means from the higher pressure zone beyond said means, said means including an inlet and deflecting vanes defining passages, the total cross-sectional area of which is not substantially greater than that of the conduit adjacent said inlet, said means being disposed at substantially the location of the acceleration front traveling through the inert gases in the conduit at the instant that the acceleration of the burned gases produced by the burning of each charge ceases, and a receiver connected to the converting means and storing under pressure gases received therefrom.

MICHEL KADENACY.

REFERENCES CITED

The following references are of record in the file of this patent:

UNITED STATES PATENTS

| Number | Name | Date |
|---|---|---|
| 1,246,159 | Ricardo et al. | Nov. 13, 1917 |
| 1,671,719 | Hayes | May 29, 1928 |
| 2,047,928 | Haring | July 14, 1936 |
| 2,198,730 | Kadenacy | Apr. 30, 1940 |

FOREIGN PATENTS

| Number | Country | Date |
|---|---|---|
| 308,595 | Great Britain | Aug. 18, 1930 |
| 461,757 | Great Britain | Feb. 24, 1937 |
| 591,372 | France | Apr. 8, 1925 |
| 626,976 | France | May 28, 1927 |

Certificate of Correction

Patent No. 2,522,118 September 12, 1950

MICHEL KADENACY

It is hereby certified that error appears in the printed specification of the above numbered patent requiring correction as follows:

Column 3, line 54, for "reeciver" read *receiver*; column 4, line 24, for "gase" read *gasses*; line 29, for " th espace" read *the space*; line 63, for "aceleration" read *acceleration*; column 7, lines 23 and 24, for "or combustion" read *of the combustible*; line 24, for "of the" read *or*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*